(12) United States Patent
Hu

(10) Patent No.: US 6,615,216 B1
(45) Date of Patent: Sep. 2, 2003

(54) LOCK FREE DATA STRUCTURE MAINTENANCE

(75) Inventor: Carl Hu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 09/606,258

(22) Filed: Jun. 29, 2000

(51) Int. Cl.[7] ............................. G06F 17/30; G06F 9/46
(52) U.S. Cl. ............................. 707/101; 707/9; 709/100
(58) Field of Search ................ 707/206, 6, 100–104.1, 707/9; 709/100, 101, 104

(56) References Cited

U.S. PATENT DOCUMENTS

| 5,319,778 A | 6/1994 | Catino ........................ 707/102 |
| 5,485,626 A | 1/1996 | Lawlor et al. .............. 709/315 |
| 6,247,108 B1 | 6/2001 | Long .......................... 711/216 |
| 6,470,344 B1 | 10/2002 | Kothuri et al. ............. 707/100 |

OTHER PUBLICATIONS

Article entitled "Relative Performance of Preemption–Safe Locking and Non–Blocking Synchronization on Multiprogrammed Shared Memory Multiprocessors", by Maged M. Michael and Michael L.Scott, University of Rochester, Department of Science, date unknown.

Article entitled "Simple, Fast, and Practical Non–Blocking and Blocking Concurrent Queue Algorithms", by Maged M. Michael and Michael L. Scott, University of Rochester, Department of Science, Jul. 1995.

Article entitled "Reducing the Overhead of Sharing on Shared Memory Multiprocessors" by Maged M. Michael, University of Rochester, Department of Computer Science, dated 1997.

*Primary Examiner*—Safet Metjahic
*Assistant Examiner*—Marcin Filipczyk
(74) *Attorney, Agent, or Firm*—Watts, Hoffmann, Fisher & Heinke, Co., L.P.A.

(57) ABSTRACT

Method and apparatus for maintaining a queue structure having data nodes within a computer memory. The queue is maintained by the steps of maintaining a pool of available data nodes for use in maintaining the queue structure. Data is added to the queue structure by adding a nodes to the queue structure. Each data node includes a data portion, a link for addressing other data nodes in the queue structure, and an identifier. Data within the queue is accessed and then removed from the queue but the data nodes are preserved in memory by adding them to the pool of available data nodes. New data nodes are added to the queue by first checking the data pool, which in an exemplary embodiment is in the form of a stack, to determine if there are any nodes available in the pool before creating a new data node.

17 Claims, 6 Drawing Sheets

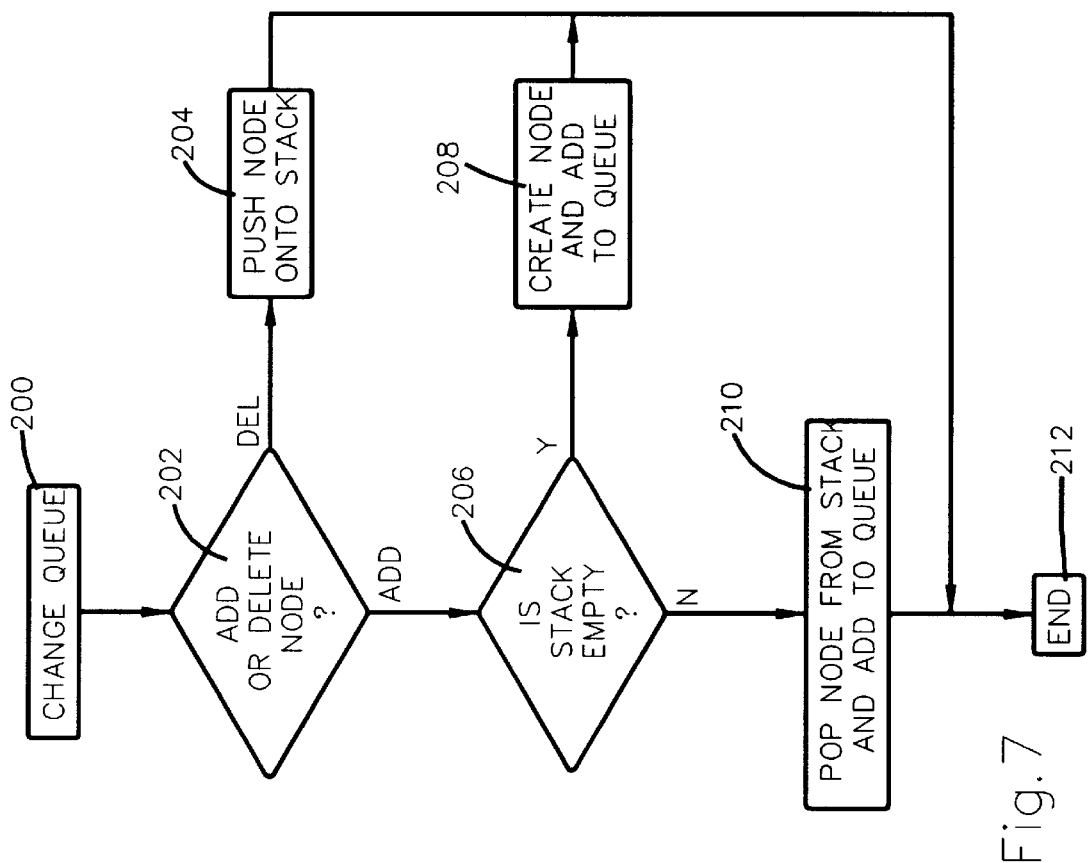
Fig. 7
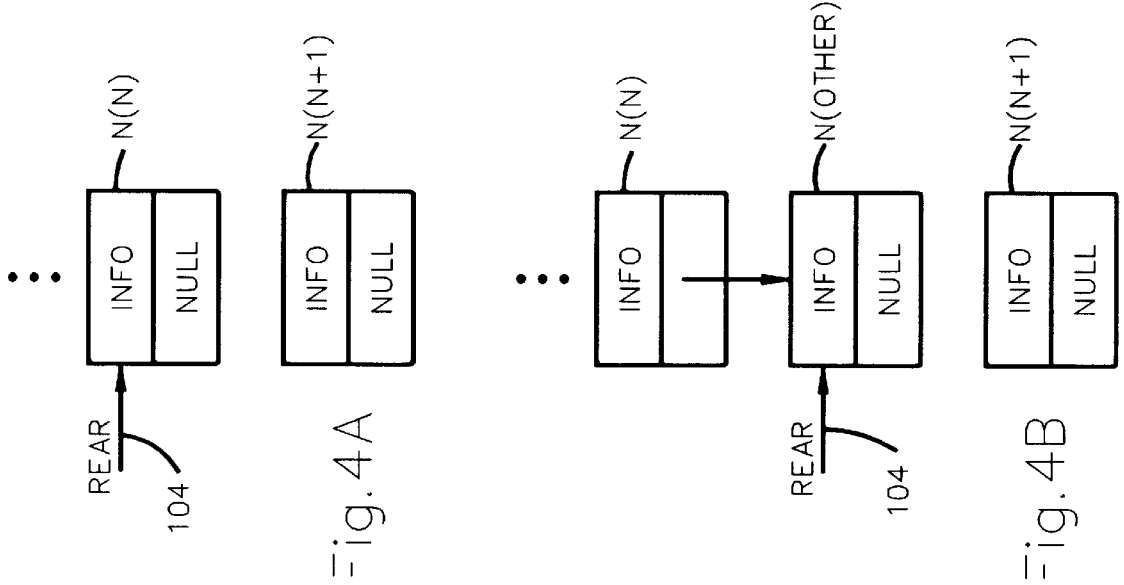
Fig. 4A
Fig. 4B

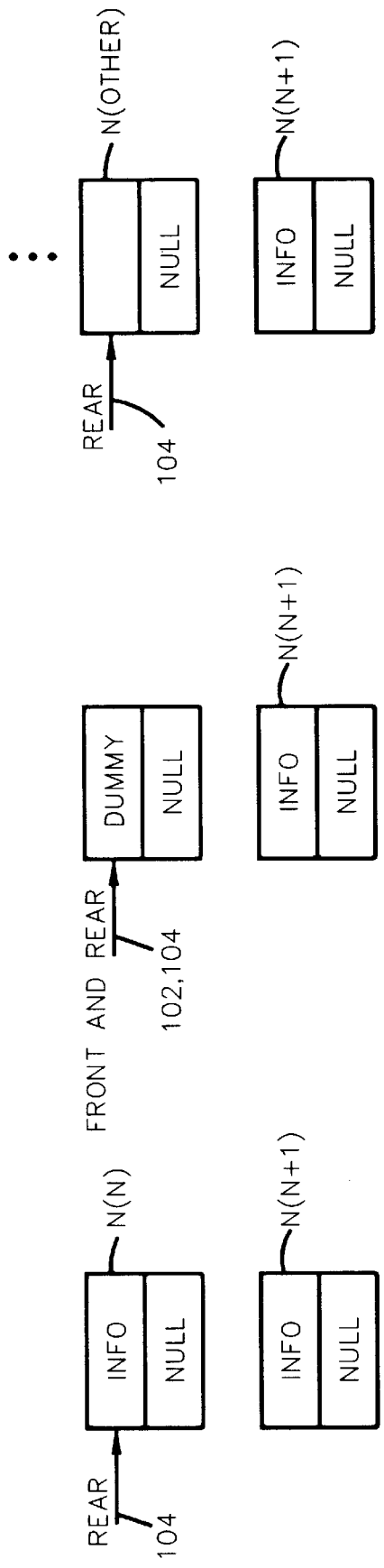

LOCK FREE DATA STRUCTURE MAINTENANCE

FIELD OF THE INVENTION

The present invention concerns a data structure for use with a computer and more particularly to a data structure that can be maintained by multiple processes running at the same time without loss of data structure integrity.

BACKGROUND ART

Updating or maintenance of data structures in a computer system becomes more difficult when the system has multiple processes running on multiple processors which are allowed access to the same data structure. In these so called shared memory systems, memory is accessible to all processors and the processors communicate through shared variables. One way of insuring that a data structure is properly maintained or updated in a shared memory system is to lock out processes and grant exclusive access to the shared memory to a single process. This so-called locking or blocking results in inefficient utilization of processor resources.

In a lock free shared memory scheme the multiple processes communicate through shared data structures but synchronization techniques are needed to guarantee the consistency of these data structures under simultaneous update conditions. In a PhD thesis entitled "Reducing the Overhead of Sharing on shared Memory Multiprocessors" by Michael from the Department of Computer Science, University of Rochester 1997, a shared queue process is discussed. A paper to Michael et al entitled "Simple, Fast, and Practical Non-Blocking Concurrent Queue Algorithms" also discusses the process of updating a queue using a lock free update process.

In setting up the shared queue the Michael thesis discusses an update problem known as the ABA problem. If a first process reads a value A in a shared memory location, then computes a new value, and then attempts a compare and swap operation to insert the new value into the shared location, the operation may succeed when it should not. Assume that after the reading of the shared memory but before the compare and swap, a second process having access to the shared memory location changes the value of the shared memory from A to B and then back to A The compare and swap performed by the first process should fail but it does not. A way of solving the ABA problem is to associate a modification counter with a pointer and to always access the counter with the pointer in any read-modify compare and swap operation.

The queue mentioned in the Michael thesis is implemented as a singly linked list having a tail pointer and a head pointer and uses a so called compare_and_swap instruction with modification counters to avoid the ABA problem.

SUMMARY OF THE INVENTION

The present invention concerns an efficient lockless data structure particularly suited for use in a multithreaded operating system that may include multiple processors executing stored program instructions for updating or maintaining the data structure. In one exemplary embodiment of the invention the data structure is a list structure. A queue such as the queue discussed in the Michael thesis is a specific form of a list data structure for storing data items (integers, floats, strings etc or structures made up of combinations of such data elements) in a first in, first out manner so that the data items can be added to and retrieved from the queue. On a multiprocessor system that uses shared memory data structures, there can be a single list that is accessed by multiple different processors executing multiple different processes or threads. The invention maintains the integrity of the queue list without resort to locking out threads from the multiple processors accessing the shared data structure.

The invention allocates data structure nodes from available memory and does not deallocate the nodes until the data structure (a queue for example) is released. Each node has a two part 64 bit (8 byte) unique identifying number. One part of the number is a pointer to a next queue node (32 bits) and the second part of the number (32 bits) is an integer that is an identifier or counter for that node which exists for the life of the data structure. The combination of the pointer and identifier are unique. A 64 bit compare_and_swap (CAS) instruction used with the invention is a hardware implemented operation that is more efficient than a comparable software technique. Use of this 64 bit compare and swap instruction allows any of a possible large number of multiprocessor threads to efficiently check the integrity of the contents of a node and take steps to properly implement an addition to the data structure or a deletion from the data structure even if a node is 'simultaneously' changed by another thread running on another processor. This integrity check is performed with the help of the pointer/counter combination (64 bits).

Access violations are avoided by keeping all nodes alive by means of a stack that is formed of nodes taken from the data structure by a processor thread. The stack is only released when its corresponding list data structure is released. Furthermore, nodes can be popped from the stack and reused as nodes on the list data structure without compromising the integrity checking since their identifier survives. Furthermore, reusing nodes from the stack is much faster to achieve than allocating a new node for use by means of the relatively slow C++ 'new' operator, for example.

An exemplary method performed in accordance with the invention maintains a list structure having data nodes within a computer memory. The list is maintained by the steps of maintaining a pool of available data nodes for use in maintaining the list structure. Data is added to the list structure by adding a nodes to the list structure. Each data node includes a data portion, a link for addressing other data nodes in the queue structure, and an identifier. Data within the list is accessed and then removed from the list but the data nodes are preserved in memory by adding them to the pool of available data nodes.

These and other objects, advantages and features of the invention will become better understood from the accompanying detailed description of one exemplary embodiment of the present invention.

BRIEF DESCRIPTION OF THE DRAWINGS

FIGS. 4A and 4B are depictions illustrating multiprocessor operations on a queue;

FIGS. 5A–5C are depictions illustrating additional multiprocessor operations on a queue;

FIG. 7 is a flowchart of a process for performing an exemplary embodiment of the invention.

EXEMPLARY EMBODIMENT FOR PRACTICING THE INVENTION

Figure 1:
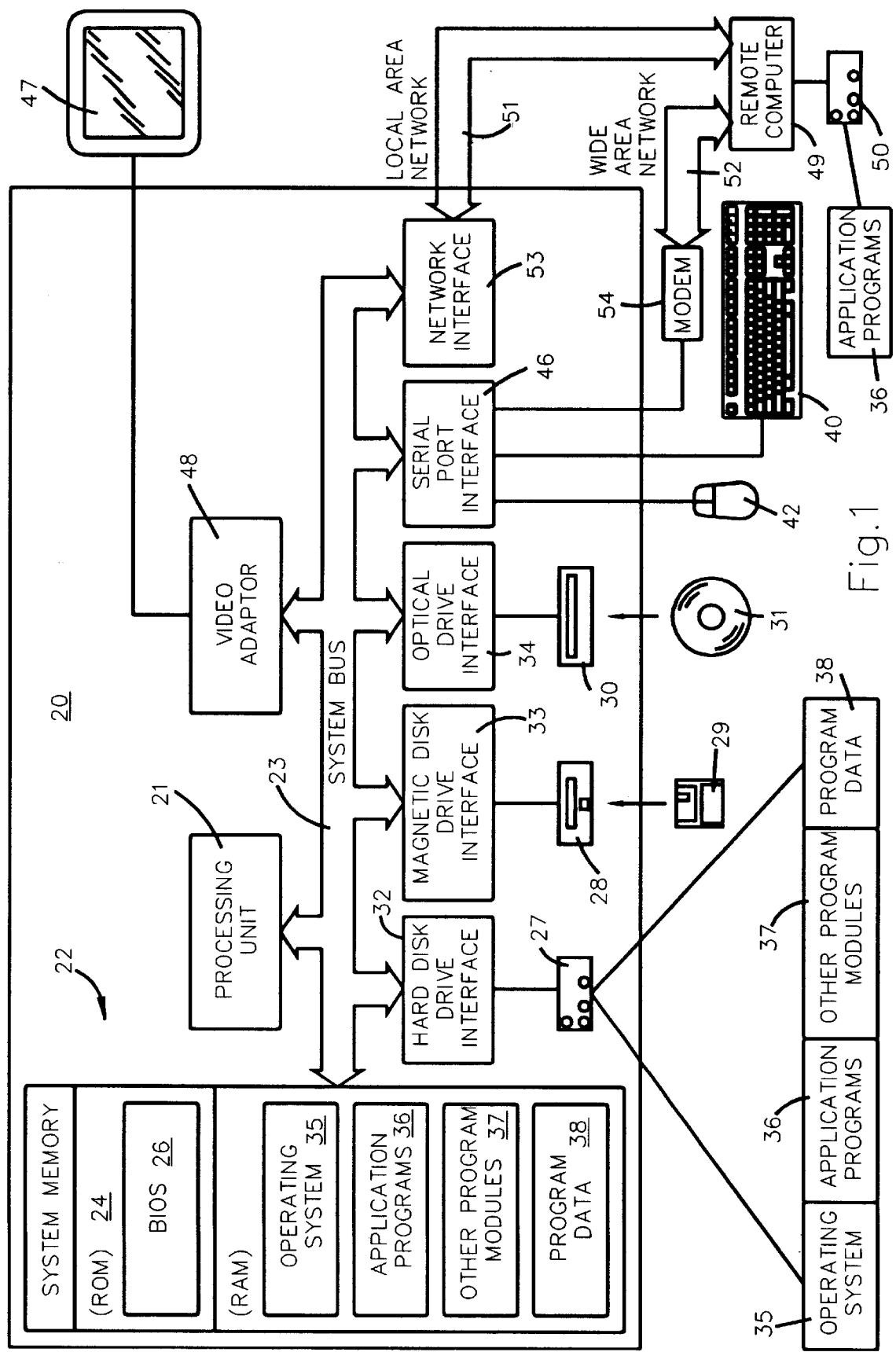
FIG. 1 an exemplary data processing system for practicing the disclosed invention.

With reference to FIG. 1 an exemplary data processing system for practicing the disclosed data mining engine invention includes a general purpose computing device in the form of a computer system 20, including a plurality of processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

A representative local bus suitable for use with multiple processors is disclosed in the PhD thesis to Michael at section 5.2.1. This section and the accompany figure describe a multiprocessor system made up of 16nodes wherein each of these nodes includes four processors with associated cache memory that interfaces between the processor and the local SMP bus which in turn communicates with a memory which is shared between processors.

Returning to FIG. 1, the system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35 wherein each of the multiple processors 21 of the computer system executes one or more program threads, one or more application programs 36, other program modules 37, and program data 38. A user may enter commands and information into the computer system 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49 that also includes a plurality of processors. The remote computer 49 may be another personal computer, a server, a router, a network PC, a peer device or other common network node, and typically includes many or all of the elements described above relative to the computer system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such, as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

The List Data Structure

Figures 2A, 2B, 2C:
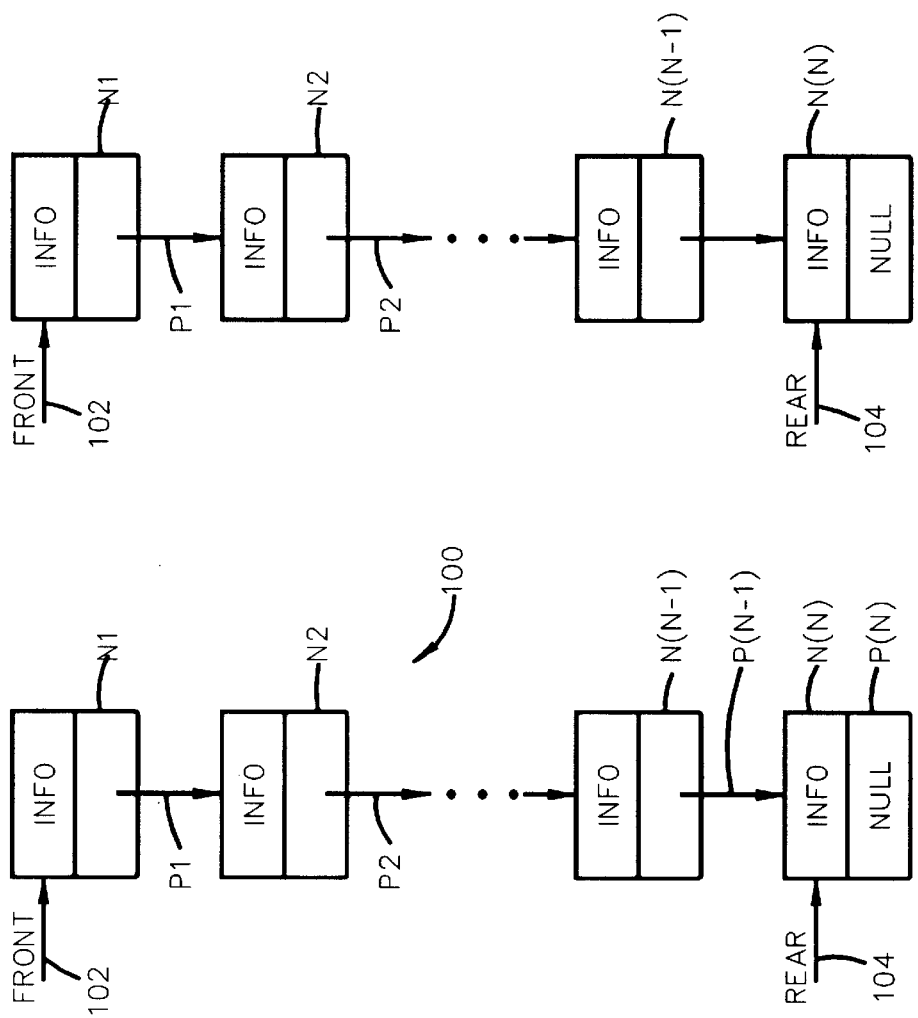
FIGS. 2A–2C are depictions of a queue and illustrate the steps in adding a data node to the queue.

The computer system 20 of FIG. 1 maintains a collection of items in the form of a list data structure. In the particular list discussed in detail below, items may be deleted at one end of the list that is referred to as the front and items may be inserted at the other end which is referred to as the rear. This particular form of list is referred to as a queue. FIG. 2A is an example of a queue 100 having a plurality of nodes that have been labeled N1, N2, . . . N(N). Each of the nodes has been designated in the FIG. 2A depiction as containing information (INFO) which can range from simple data types such as integers to complex data types made up of combinations of different types of data. As an example the information contained in a data node of the queue 100 could be a structure made up of strings, integers, characters, floating point numbers etc. all defined by a structure definition given to a node.

The queue 100 (FIG. 2A) has one node N1 that has been designated as the 'Front' node and is located with a FRONT pointer 102. A second node that has been designated as the 'Rear' node N(N) and is located with a REAR pointer 104. Each data node includes as its definition a pointer referred to as a next pointer. These next pointers are depicted as a series of arrows in the FIG. 2A representation. A pointer P1 that forms a part of the Front node N1 points to or identifies the address of a second node N2 within the chain of nodes that make up the queue 100.

When the queue is first initialized there is no data in the queue. A dummy data node is created, but that node contains no useful information. The only global information contained by the processors running code in the system 20 is the address (pointers to) the front and the rear of the queue FRONT, REAR 102, 104 which point to the same location when there is only a dummy data node in the queue.

FIGS. 2B and 2C depict the process of inserting a data node into an already existing queue 100 such as the queue depicted in FIG. 2A. The step of inserting a data node is referred to interchangeably as either a 'put' or an 'enqueue' to the queue. As seen in FIG. 2B, a new node designated as a node N(N+1) is shown as already having information INFO. The step of creating the information contained in this new node is performed by one of the multiple processors 21 that make up the computer system 20. At the stage depicted in FIG. 2B this information has been added to the node labeled N(N+1). FIG. 2C indicates the step of adding the node N(N+1) to the queue. The queue's rear pointer REAR 104 must be adjusted to point to the new node N(N+1) and the next pointer of the node N(N) (which was previously nil or null, Note, null and nil are used interchangeably and constitute a special pointer value not pointing to any specific memory location) must be adjusted to point to the new data node N(N+1).

Figure 3B:
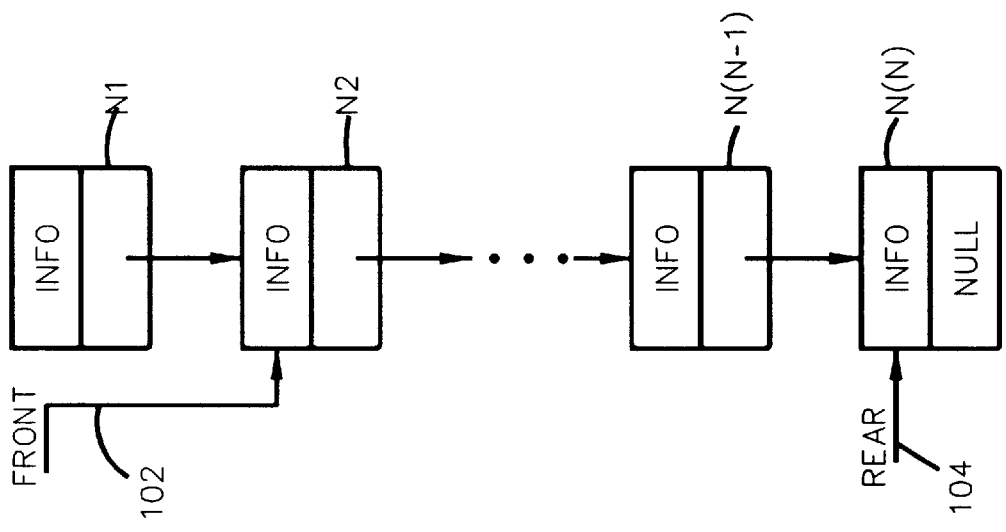
FIGS. 3A–3B are depictions of a queue and illustrate the steps in deleting a data node from the queue.
Figure 3A:
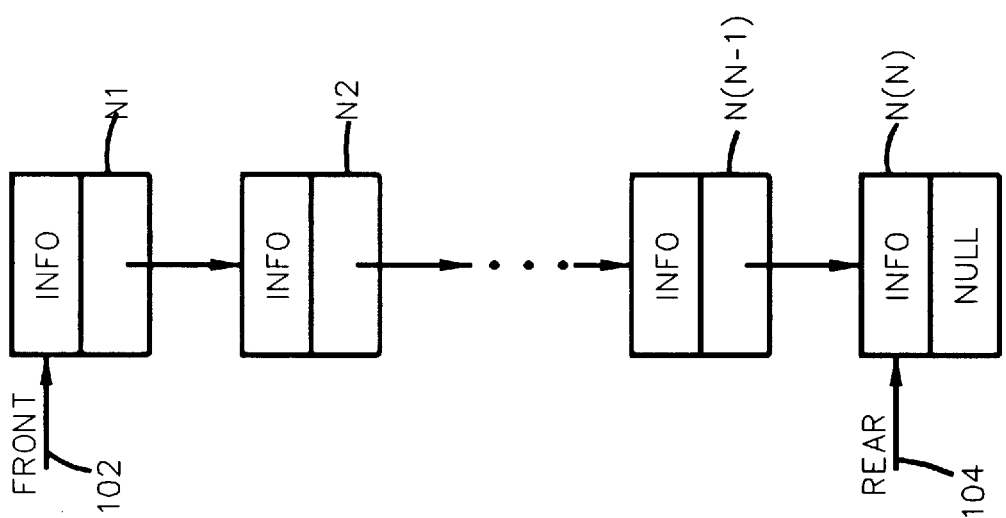

FIGS. 3A and 3B depict the steps in deleting a data node from an already existing queue 100 such as the queue depicted in FIG. 2A. The step of deleting a data node is referred to interchangeably as either a 'get' or an 'dequeue' from the queue. As seen in FIG. 3A, an existing node designated as the node N1 is shown as the location pointed to by the front FRONT pointer 102 of the queue 100. The step of gathering the information contained in the FRONT node N1 is performed by one of the multiple processors that make up the computer system 20. Since the FRONT node N1 in FIG. 3A contains the information needed by the processor, the processor can merely access the information and then release the node by repositioning the FRONT pointer 102 to the next subsequent node N2 in the queue. The processor releases the node N1 by freeing the memory. Note in a programming environment such as C++ the step of releasing the node might, for example, be performed by calling the destructor for the node. FIG. 3B indicates the newly positioned FRONT pointer pointing to the node N2. The pointer REAR 104 is unaffected by the step of getting the node N1.

The queue representations shown in FIGS. 4A, 4B, 5A, 5B, and 5C are used to illustrate some of the potential problems in adding and deleting nodes to and from a queue structure. FIG. 4A illustrates a new node N(N,+1) about to be added to the queue having an a rear node N(N). The node N(N+1) contains information INFO that was created by a first processor. The node N(N+1) can be attached by the step of adjusting the pointer N(N) next to point to the new node N(N+1) and adjusting the REAR pointer 104 to also point to this new node N(N+1). Before the first processor can do this, however, a second processor inserts another node designated OTHER in FIG. 4B to the queue and resets the queue's REAR pointer 104 to the this other node N(OTHER). If the first processor attempts to change the pointers from the node N(N) to point to the new node N(N+1) rather than changing the pointer from the node N(OTHER), the first processor will have incorrectly updated the queue 100. The correct step that the first processor should perform is to connect the node N(N+1) to the node N(OTHER) and reposition the REAR pointer to the node N(N+1).

Consider the following pseudocode for adding a node.(a put)to the REAR of a queue.

---
Listing 1
---

```
Put()
{
    P_new = new node; // initialize a new node
    P_new.next = nil; //new node will be REAR node when inserted, set
    next pointer to nil
    temp = REAR; // copy existing REAR node to a temporary
    variable
    temp.next = P_new; // new node becomes REAR
    while (!CAS(REAR,temp,P_new){
        temp = REAR;
        temp.next = P_new;
    } //while
}// Put
```

The above pseudocode is in the 'C' style of coding convention well known to those skilled in the art of computer programming. For this discussion it is assumed that the setting up of the new node N(N+1)) in FIG. 4A is performed using the C++ 'new' operator. A fundamental and significant improvement in this step of providing a node is discussed below in conjunction with an operation for maintaining nodes during the life of the queue. Returning to the psuedocode, the next pointer for this new node $P_{new}$ next is set to NIL (or NULL) and then the contents of the current REAR node are copied to a temporary data node. This all occurs before the pointers are reassigned to implement the addition of the new node at the REAR of the queue.

The CAS operation (a compare and exchange instruction) within the while loop logic test is an instruction that is implemented using inline assembly instructions and is available on Pentium and later Intel processors, for example. The CAS instruction returns a boolean result. The CAS instruction takes three arguments. A first argument to the instruction is an address to a shared memory location that can be accessed by the multiple processors 21 of the computer system 20. The second argument is an expected value for the contents of that memory location and the third argument is a new value to be placed in that location. If the shared location currently holds the expected value, it is assigned the new value atomically and the CAS instruction returns true. Otherwise it returns false and the replacement does not take place. Listing 2 is an assembly language implementation for Intel's Pentium and later processors of the CAS instruction and has been designated as 'InterlockedCompareExchange64'. The '64' in this instruction refers to the fact that the instruction takes 64 bit arguments. This means that the instruction compares the 64 bits starting at pDestination with the argument exchange. If they are identical, the instruction updates the 64 bits pointed to by pDestination with 'comperand'. In both cases, the function returns the original value of *pDestination. This function is performs the compare and swap (CAS) instruction.

---
Listing 2
---

```
inline __int64 InterlockedCompareExchange64 (volatile __int64*
pDestination, __int64 exchange, __int64 comperand)
{
    __asm
    {
        mov esi, pDestination
        mov eax, DWORD PTR comperand[0]
        mov edx, DWORD PTR comperand[4]
```

-continued

Listing 2

```
    mov ebx, DWORD PTR exchange[0]
    mov ecx, DWORD PTR exchange[4]
    _emit 0xF0        //lock
    _emit 0x0F        // cmpxchg8b [esi]
    _emit 0xC7
    _emit 0x0E
    // result is in DX,AX
    }
}// end of listing two
```

Returning to the example of updating the queue depicted in FIG. 4B, the CAS instruction will fail the first time the while loop is entered due to the action of the second processor changing the REAR node to the node N(OTHER). When the first processor executes the CAS instruction of the while loop, the first argument is a pointer to the global REAR pointer that has been reset by the second processor to point to node N(OTHER). The first processor compares the contents of the node N(OTHER) to the contents of the 'temp' node which is therefore the contents of the node N(N). The two are not the same so the CAS instruction returns false. The boolean value evaluated by the while statement becomes true and the first processor enters the while loop. Thus, the while loop is only entered when the CAS instruction fails.

In the while loop the first processor sets the contents of the temporary local variable 'temp' to the new REAR queue node. The temporary variable's next pointer is set to $P_{new}$ the new node. This time when the while test is evaluated by means of the CAS instruction the first processor compares the contents of the node designated as REAR with the contents of the temporary variable 'temp'. Assuming no other processor has inserted any other nodes this test will succeed meaning the while loop will end. Importantly, the last step the CAS instruction performs when it succeeds is to reset REAR, the global pointer to the new node so that the process of putting a node onto the end of the queue is complete.

Avoiding the ABA Problem

Turning now to the steps in inserting a node to a queue shown in FIGS. 5A–5C, one sees another situation in which the present invention allows correct updating of the queue. In FIG. 5A one sees a queue having a rear node N(N) and a first processor has created a node N(N+1) for addition to the end of the queue. A put( ) operation as outlined in Listing 1 is the appropriate step for the first processor to perform. Instead of the problem outlined above with regard to FIGS. 4A and 4B, assume the second processor gains access to the shared memory queue and totally empties it. That is as seen in FIG. 5B, the second processor creates an empty or dummy queue node that is both front and the rear of the queue. Furthermore, the second processor then adds other nodes to the queue as shown in FIG. 5C.

During its compare operation, to enhance its performance, the CAS instruction only compares a limited size memory at the location pointed to by its first argument. The ABA problem occurs if the second processor adds N(OTHER) at precisely the same memory location as N(N) (the previous rear of the queue) and the two nodes N(N) and N(OTHER) are identical or contain the same contents at the memory location that is compared. In these circumstances, the CAS instruction will succeed but the nodes are not the same. The Michael PhD thesis addresses this ABA problem by use of a global counter variable that is unique for every node. This unique integer variable is made a part of the CAS compare operation and will avoid erroneous comparisons when performing the CAS instruction.

One suitable class definition for a pointer to a queue node is as follows:

```
template <class T> struct PtrToWaitFree QueueNode
{
    union {
        _int64 volatile m_i64; //ensure 8 bit alignment
        structure PtrType {
            Cwait Free queueNode <T> volatile *m_Ptr;
            _int32 volatile m_iCount;
        } m_64BitCombo;
    };
    //.....other pointer class functions
}
```

This definition defines a 64 bit pointer type m_64BitCombo. The first 32 bits of the pointer are the real pointer and the second 32 bits contain a monotonically increasing count that all processors are responsible for maintaining. The CAS operation used in the put instruction of listing 1 always compares the unique count of the two nodes, one node at the rear of the queue and a second node that has been copied to the temporary local variable. The fact that another processor has added a node N(OTHER) at the same location will be detected and cause the first processor to enter the while loop of the put operation to adjust the update process. This follows from the fact that the other processor will assign a different identifier or count to the node N(OTHER) when that node is created.

Avoiding Memory Access Violations

The queue update sequence depicted in FIGS. 5A–5C also illustrates a separate memory access violation problem encountered in updating a queue. In FIG. 5A one sees a queue having a rear node N(N) and a processor has created a node N(N+1) for addition to the end of the queue. As noted previously, a put( ) operation as outlined in Listing 1 is the appropriate step to perform. Assume again that a second processor gains access to the shared memory queue and totally empties the queue leaving an empty or dummy queue node that is both the front and the rear of the queue. The second processor then adds other nodes to the queue. When the first processor attempts to add the new node N(N+1) to the rear of the queue, the CAS test will fail but in a way not anticipated by the Michael PhD thesis.

Recall the test the first processor performs on entering the while loop:

while (!CAS(REAR,temp,$P_{new}$){
        . . .
    }

The while test accesses the contents of the global REAR pointer which is fine since the REAR pointer points to N(OTHER). The above test also attempts to access the contents of 'temp'. Recall that temp was set to the previous global Rear pointer which pointed to the queue node N(N). But further recall that the Rear node was removed by the second processor and released by that processor. When the first processor attempts to access the contents of temp a memory access violation occurs since the multi-threaded operating system has released that memory by means of the destructor for the node N(N).

To eliminate memory access violations and also to speed the process of adding nodes to a queue, the present invention requires all the processors having access to the queue to help maintain a stack structure for storing data nodes of the same node type as the queue depicted in FIG. 2a for example.

Figure 6C:
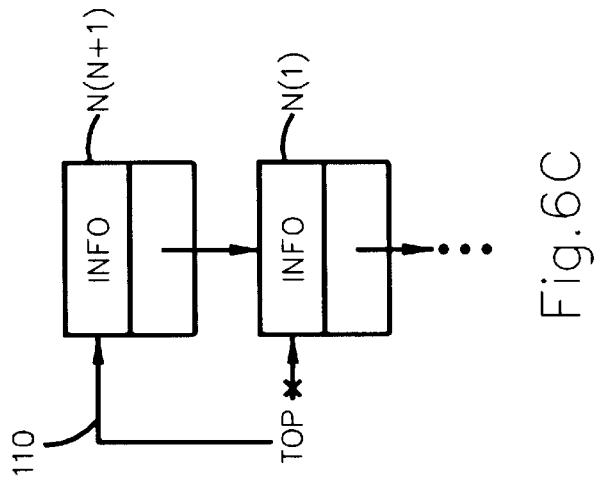
FIGS. 6A–6C are depictions illustrating operations performed on a data node stack used in accordance with the exemplary embodiment of the invention.
Figure 6B:
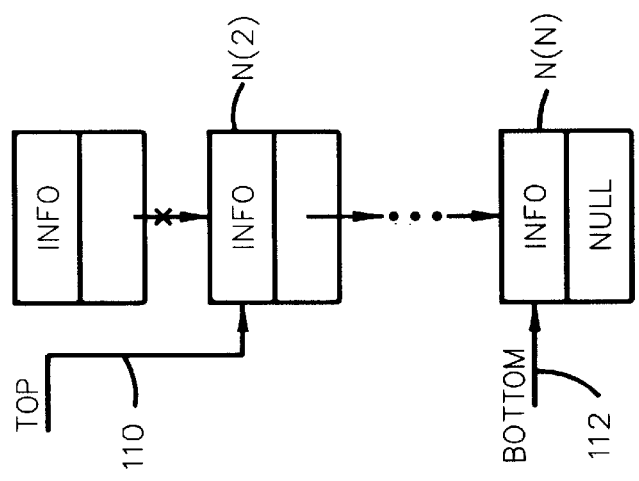
Figure 6A:
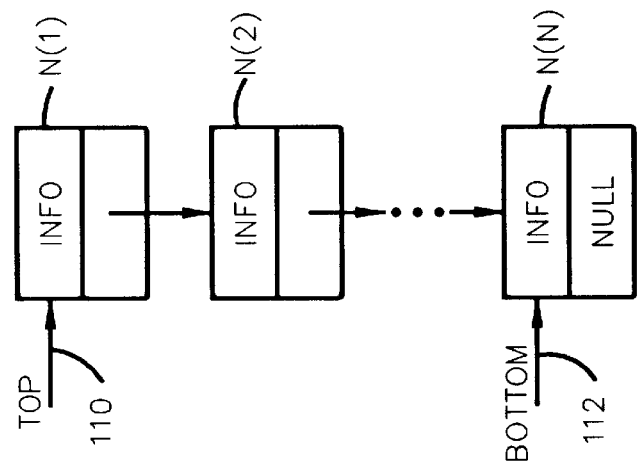

FIG. 6A illustrates a suitable stack structure. There are two operations that can be performed with the stack, a node can be added to the stack by means of the push instruction or a node can be retrieved from the stack by means of the pop instruction. The stack is characterized by a TOP pointer 110 and a BOTTOM pointer 112 as seen in FIG. 6A. Popping a node from the stack is accomplished by accessing the contents of the TOP node and then causing the TOP pointer to point to the second node on the stack. (FIG. 6B) The process of pushing a node onto the stack is performed by the step of causing the TOP pointer to point to the new node and causing the next pointer of this new node to point to the previous TOP node. This process is shown schematically in FIG. 6C. In a multiprocessor environment where multiple processor have access to a stack, the process of pushing or popping data must be performed with a safe procedure such as by use of the CAS instruction.

Listing 3 below is psuedocode for the process of pushing a node onto the stack.

---

Listing 3

---

```
Push(){
    P_new = new node;
    Temp = HEAD;
    P_new.next = Temp;
    While(!CAS(HEAD,Temp,P_new)){
        Temp = HEAD;
        P_new.next = Temp;
    }
}
```

---

This sequence of instructions makes the steps of adding a node to the stack safe since if a second processor pushes a new node onto the stack, the While test will succeed and the steps within the while loop will be performed until the CAS statement succeeds (and hence the while test fails). This sets the head to the $P_{new}$ node as desired and causes the $P_{new}$.next pointer to point to the old HEAD node as is also desired.

Returning to the problem presented in FIG. 5C, when a queue is first created a corresponding stack is also created and maintained for the life of the queue. Both the queue and the stack initially have dummy nodes as their contents. Each time a processor gets a node from a queue, instead of freeing the node from memory, the processor which gets the node pushes that node onto the stack corresponding to the queue. Returning to the situation depicted in FIGS. 5A–5C, when the second processor gets the former rear node N(N) to which the first processor was attempting to attach a node, the second processor will push the node N(N) onto the stack (such as the stack of FIG. 6A). When the first processor performs the CAS operation of listing 1, the CAS will return a false value but will not cause a memory access violation in the operating system.

The process of maintaining the stack also results in an additional added improvement in maintaining a queue data structure. Each time a processor adds a node to the queue, it has to create a new queue node from available memory. The process of creating a new node can take many hundreds of processor cycles. In accordance with the exemplary embodiment of the invention, the processor seeking to add a new node to the queue (a put) will first check the stack that is maintained with the queue. If there is an available node on the stack this node is popped off the stack, populated with data and added to the queue. This process is much faster than using the C++ new procedure. The ABA problem is avoided by use of the node identifier or counter. Each time a node is removed from a queue the identifier for that node is incremented as is the variable used by all processes to get the unique identifier for new nodes.

Each time a node pointer is written to, the global variable is incremented. That is, each time the CAS instruction is successful and a pointer location is written to, the global identifier is incremented. The global identifier assigned to a node is global in the sense that it is shared by all threads. Two threads can assign the same counter to different nodes with different addresses. Use of the CAS instruction, however, guarantees no two nodes can have the same address and the same counter. If a second process pops off a node that was retrieved from the queue and a process performs a CAS instruction, the test will fail even if the stack node is put back at the identical memory location it previously occupied when the first process was attempting to update the queue.

Use of the stack for maintaining nodes for the life of the queue has been tested with excellent results. It turns out that the lockfree queue is faster to maintain during updating of the queue on both multiprocessor and single processor (multithreaded) computer systems. This makes use of the invention an attractive option on a variety of system architectures.

FIG. 7 is a flowchart depicting an exemplary method or process for changing 200 a queue structure such as the queue 100 of FIG. 2A having data nodes in a computer memory. The method can either add or delete data nodes from the queue and at a decision step 202 the process which step to perform.

If the process is to delete a node, a right branch is taken. The process maintains a pool of available data nodes in the form of a stack structure for use in maintaining the queue 100. When a node is deleted, its contents are used by the process that accessed that node and the process pushes 204 the deleted node onto the stack structure and the method ends 212.

Adding data to the queue 100 is slightly more complicated. In order to add a node, the process must first determine 206 if the stack of nodes is empty. If the stack is empty a new node is created 208 (by the new C++ process for example) and that new data node is added at a rear of the queue structure. If the stack is not empty the process pops 210 a node from the stack, changes its contents, and then adds it to the queue 100.

The present invention has been described with a degree of particularity. It is appreciated, however, that the invention is intended to include all modifications and alterations falling within the spirit of scope of the appended claims.

What is claimed:

1. A method for maintaining a list structure having data nodes in a computer memory accessible by multiple processors, said method comprising the steps of:

a) maintaining a pool of available data nodes for use in maintaining the list structure; wherein each data node includes i) a data portion ii) a link for addressing other data nodes in the list structure and iii) a unique identifier for said data node;

b) adding a data node to the list structure from the pool of data nodes and if there is no such available data node in said pool, creating a new data node from available computer memory that includes i) a data portion ii) a link for addressing other data nodes in the list structure and iii) a unique identifier for said data node, and adding the new data node to the list structure; said adding step comprising a lock free step which checks the identifier of a data node of the list before adding a node to said list structure; and c) accessing data from the list structure by determining the contents of a specified data node, removing the specified data node from the list structure and adding the specified data node from the list structure to the pool of available data nodes.

2. The method of claim 1 wherein the pool of available data nodes is a stack structure that is created contemporaneously with the list structure.

3. The method of claim 2 wherein the stack structure is maintained by use of a compare and swap instruction.

4. The method of claim 1 wherein the pool is maintained as a stack structure wherein data nodes are pushed onto the stack when they are removed from the list and wherein data nodes are popped off the stack for addition to said list structure.

5. The method of claim 1 wherein the list is a queue structure and wherein new nodes are added at one end of the queue structure and data is accessed from the queue by getting data from another end of the queue structure.

6. The method of claim 1 wherein each of the multiple processors adds nodes to the list structure and assigns a unique pointer/counter combination to each data node added to the list structure.

7. A method for maintaining a queue structure having data nodes in a computer memory accessible by multiple processors, said method comprising the steps of:

a) maintaining a pool of available data nodes for use in maintaining the queue structure; wherein each data node includes i) a data portion ii) a link for addressing other data nodes in the queue structure and iii) a unique identifier for said data node assigned by one of the multiple processors;

b) adding data to the queue structure by adding a data node from the pool of available data nodes at a rear of the queue structure and if there are no such available data node creating a new data node from available computer memory that includes i) a data portion ii) a link for addressing other data nodes in the queue structure and iii) a unique identifier for said data node assigned a processor, and adding the new data node to the queue structure; said adding step comprising a lock free step which checks the identifier of data nodes of the queue structure before adding a node; and c) accessing data from the queue structure by determining the contents of an front data node, removing the front data node from the queue structure and adding the data node removed from the queue structure to the pool of available data nodes.

8. The method of claim 7 wherein the pool of available data nodes is a stack structure.

9. The method of claim 8 wherein the step of adding data to the queue structure is performed by determining if an available data node is contained in the stack and popping said available data node from the stack, and adding data to said available data node for insertion into the queue structure.

10. Computer apparatus comprising:

a) a plurality of processors wherein each processor executes a stored program for performing one or more tasks including a task of adding to and deleting data from a data structure made up of a plurality of data nodes; and b) a shared memory accessible to the plurality of processors for maintaining said data structure wherein each of the plurality of processors has access to the shared memory to allow said processor to add or delete data nodes from the data structure;

c) wherein the stored programs executing on each of the plurality of processors assigns a unique pointer/counter combination to each data node and includes a lock free procedure for updating the data structure by maintaining an available pool of data nodes for use in updating the data structure.

11. The computer apparatus of claim 10 wherein each time one of the plurality of processors writes data to a data node in either the data structure or in the available pool it updates the counter.

12. The computer apparatus of claim 10 wherein the data structure is a list structure.

13. A computer readable medium having computer executable instructions for performing steps on a computer having a computer memory of:

a) maintaining a pool of available data nodes for use by multiple processors in maintaining a list structure; wherein each data node includes i) a data portion ii) a link for addressing other data nodes in the list structure and iii) a unique identifier for the node;

b) adding a data node to the list structure from the pool of data nodes and if there is no such available data node in said pool, creating a new data node from available computer memory that includes i) a data portion ii) a link for addressing other data nodes in the list structure and iii) a unique identifier for said data node, and adding the new data node to the list structure; said adding step comprising a lock See step which checks the identifier of the data node of the list before adding a node; and c) accessing data from the list structure by determining the contents of an endmost data node, removing the endmost data node from the list structure and adding the endmost data node from the list structure to the pool of available data nodes.

14. The computer readable medium of claim 13 wherein the list structure is a queue structure.

15. The computer readable medium of claim 13 wherein the pool of available data nodes is a stack structure that is created at the time the list is first created.

16. The computer readable medium of claim 15 the stack structure and the list structure are maintained by a plurality of processors which execute a compare and swap instruction to avoid inaccurate updating of said stack and list structures.

17. The computer readable medium of claim 15 wherein data nodes are pushed onto the stack when they are removed from the list and wherein they are popped off the stack for addition to said queue.

* * * * *